(12) United States Patent
Hadland

(10) Patent No.: US 8,291,099 B2
(45) Date of Patent: Oct. 16, 2012

(54) PROTOCOL CONVERSION USING FACILITIES AND UTILITIES

(75) Inventor: John K. Hadland, Omaha, NE (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/309,323

(22) Filed: Dec. 1, 2011

(65) Prior Publication Data

US 2012/0079127 A1 Mar. 29, 2012

Related U.S. Application Data

(60) Division of application No. 12/567,904, filed on Sep. 28, 2009, now Pat. No. 8,166,188, which is a continuation of application No. 10/885,346, filed on Jul. 6, 2004, now Pat. No. 7,617,325, which is a continuation of application No. 10/138,397, filed on May 3, 2002, now Pat. No. 6,766,375, which is a continuation of application No. 08/582,536, filed on Jan. 3, 1996, now Pat. No. 6,405,254.

(51) Int. Cl.
*G06F 15/16* (2006.01)
*G06F 12/00* (2006.01)

(52) U.S. Cl. .......................................................... 709/230
(58) Field of Classification Search .................. 709/203, 709/223–229, 230, 250
See application file for complete search history.

(56) References Cited

U.S. PATENT DOCUMENTS

| | | | | |
|---|---|---|---|---|
| 5,761,425 A * | 6/1998 | Miller | ...................... | 709/218 |
| 6,405,254 B1 * | 6/2002 | Hadland | ...................... | 709/230 |
| 6,766,375 B2 * | 7/2004 | Hadland | ...................... | 709/230 |
| 7,617,325 B2 * | 11/2009 | Hadland | ...................... | 709/230 |
| 8,166,188 B2 * | 4/2012 | Hadland | ...................... | 709/230 |
| 2010/0077093 A1 * | 3/2010 | Hadland | ...................... | 709/230 |

* cited by examiner

*Primary Examiner* — Zarni Maung
(74) *Attorney, Agent, or Firm* — Toler Law Group

(57) ABSTRACT

A method includes receiving first data in accordance with a first protocol from a first node using a first facility. The method further includes setting a semaphore in a semaphore field of a first entry in a process table. The method further includes translating the first data into second data using a first utility. The method further includes setting a second semaphore in a second semaphore field of a second entry in the process table. The method further includes sending the second data from a second facility to a second node in accordance with a second protocol.

20 Claims, 4 Drawing Sheets

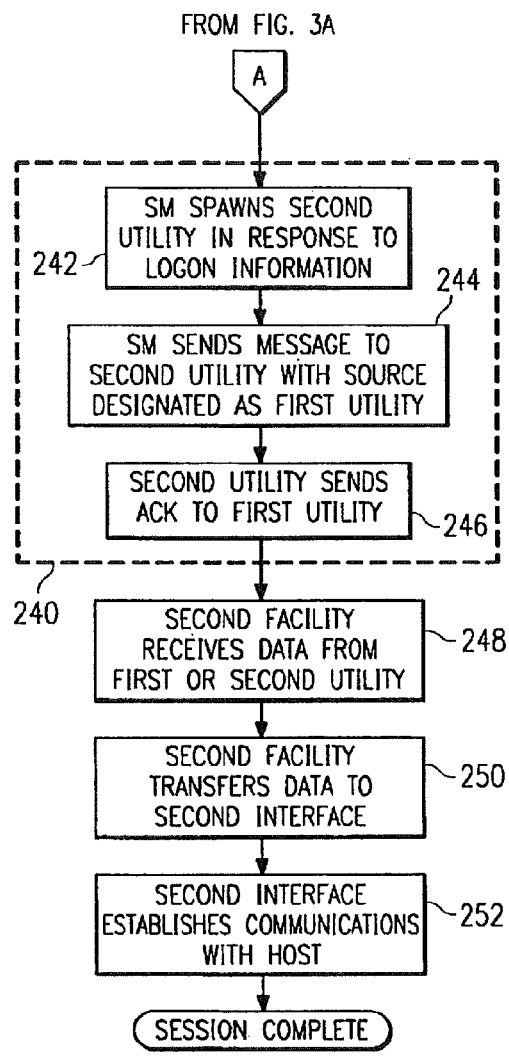
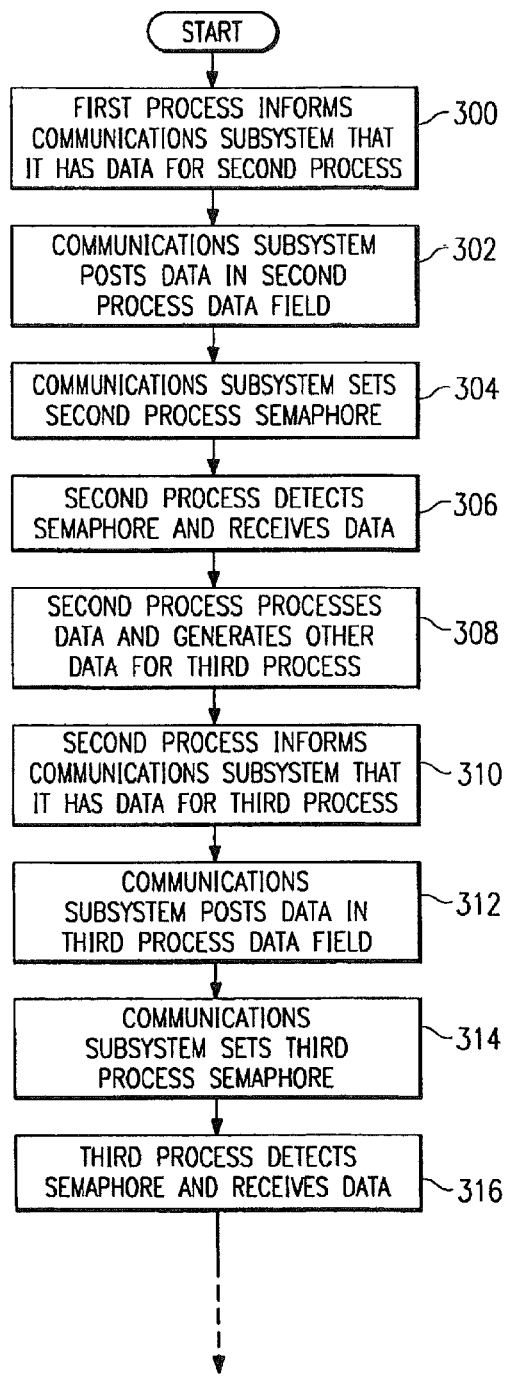

PROTOCOL CONVERSION USING FACILITIES AND UTILITIES

PRIORITY CLAIM

This application is a divisional of, and claims priority from, U.S. patent application Ser. No. 12/567,904, filed Sep. 28, 2009 and entitled "PROTOCOL CONVERSION USING FACILITIES AND UTILITIES," which is a continuation of U.S. patent application Ser. No. 10/885,346, filed Jul. 6, 2004, now U.S. Pat. No. 7,617,325, which is a continuation of U.S. patent application Ser. No. 10/138,397, filed on May 3, 2002, now U.S. Pat. No. 6,766,375, which is a continuation of U.S. patent application Ser. No. 08/582,536, filed on Jan. 3, 1996, now U.S. Pat. No. 6,405,254, each of which is hereby incorporated by reference in its entirety.

FIELD OF THE DISCLOSURE

The present disclosure is generally related to communications and more particularly to protocol conversion.

BACKGROUND

A communications system includes a collection of interconnected devices. Often these devices communicate data using different protocols. For example, a remote that communicates data in a first protocol may attempt to access a host that communicates data in a second protocol. A protocol converter may be used to allow communications between the remote and the host.

As communications systems become larger and more complex to serve a variety of devices, protocol converters should adapt to service an ever-increasing number of communications protocols. Hardware-based protocol converters are difficult to adapt to service new protocols. Current software-based protocol converters often suffer from a lack of modular design, an inflexible and unreliable hardware/software interface, and an inability to adapt quickly and efficiently to new and changing communications protocols.

BRIEF DESCRIPTION OF THE DRAWINGS

FIGS. 3A and 3B are a flow chart of a method for establishing a communications session using the protocol converter.

FIG. 4 is a flow chart of a method to manage communications among the processes running on the protocol converter.

DETAILED DESCRIPTION

Figure 1:
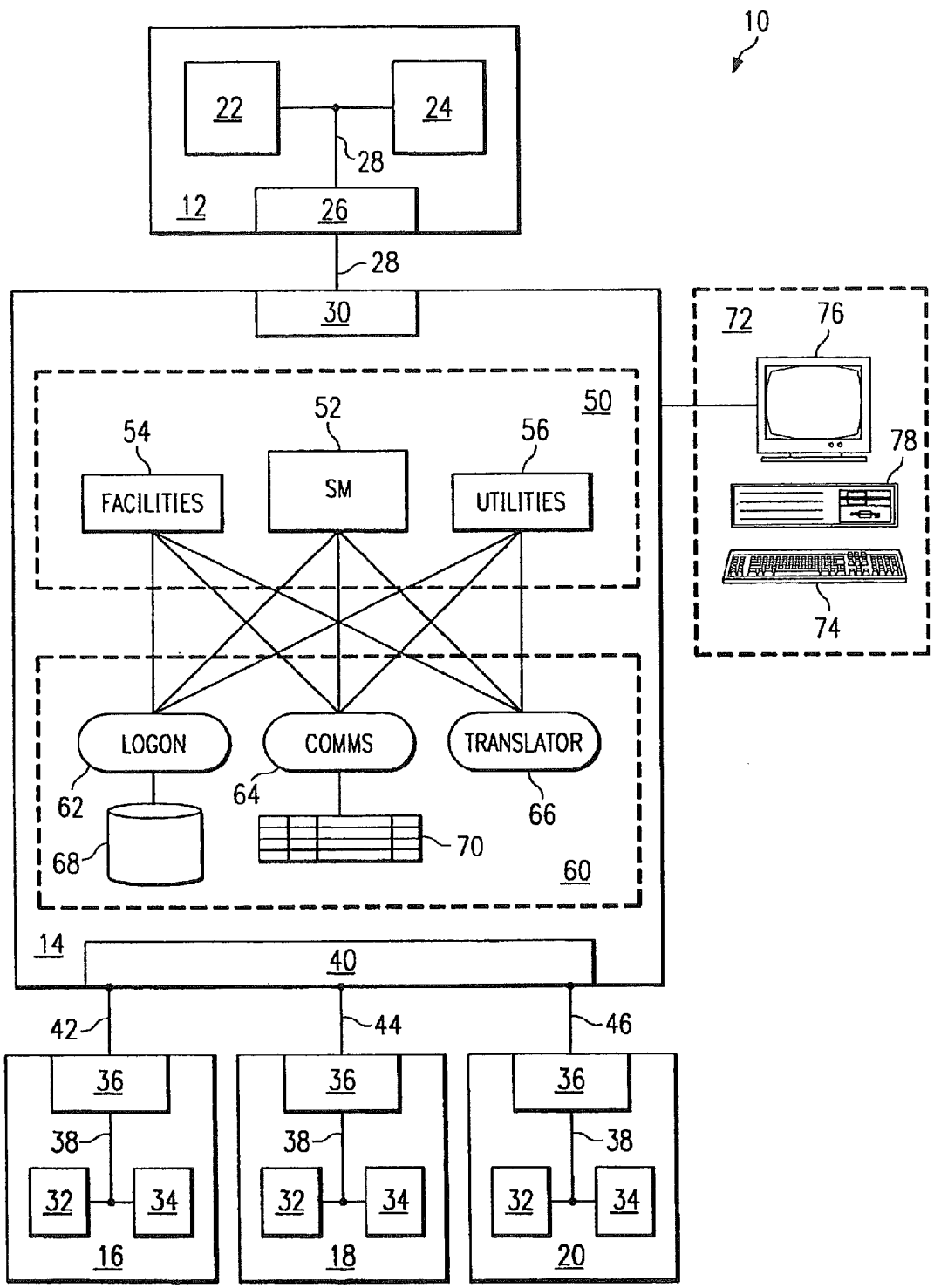
FIG. 1 illustrates a communications system having a protocol converter.

In a particular embodiment, a computer-readable storage medium includes operational instructions that, when executed by a processor, cause the processor to use a first facility to receive first data from a first node. The first data complies with a first protocol. The first facility supports at least one of a first link layer and a first line layer communications protocol. The computer-readable storage medium includes operational instructions that, when executed by the processor, cause the processor to spawn a utility in response to receiving the first data. The computer-readable storage medium includes operational instructions that, when executed by the processor, cause the processor to use the utility to translate the first data into second data in a second protocol. The computer-readable storage medium also includes operational instructions that, when executed by the processor, cause the processor to use a second facility to send the second data to a second node.

In a particular embodiment, a computer-readable storage medium includes operational instructions that, when executed by a processor, cause the processor to use a first facility to receive first data in a first protocol from a first node. The computer-readable storage medium includes operational instructions that, when executed by the processor, cause the processor to spawn a first utility and a second utility in response to receiving the first data. The computer-readable storage medium includes operational instructions that, when executed by the processor, cause the processor to use the first utility and the second utility to translate the first data into second data in accordance with a second protocol. The computer-readable storage medium also includes operational instructions that, when executed by the processor, cause the processor to use a second facility to send the second data to a second node.

In a particular embodiment, a computer-readable storage medium includes operational instructions that, when executed by a processor, cause the processor to use a first facility to receive first data in a first protocol from a first node. The computer-readable storage medium includes operational instructions that, when executed by the processor, cause the processor to place the first data in a data field of a first entry in a process table and to set a semaphore in a semaphore field of the first entry. The semaphore indicates that the first data has been placed in the first entry. The computer-readable storage medium includes operational instructions that, when executed by the processor, cause the processor to use a first utility to translate the first data in the data field of the first entry into second data in a second protocol. The computer-readable storage medium includes operational instructions that, when executed by the processor, cause the processor to place the second data in a data field of a second entry in the process table and to set a second semaphore in a second semaphore field of the second entry. The second semaphore indicates that the second data is in the second entry. The computer-readable storage medium also includes operational instructions that, when executed by the processor, cause the processor to use a second facility to send the second data from the data field of the second entry to a second node.

In a particular embodiment, a communications system includes a remote that transmits first data in a first protocol and a host that receives second data in a second protocol. A protocol converter coupled to the remote and the host receives first data from the remote. The protocol converter includes a first facility, a utility, and a second facility running as processes on the protocol converter. The first facility communicates first data to the utility, the utility translates first data into second data, and the second facility communicates the second data to the host.

Particular embodiments may include a protocol converter with a modular design to adapt quickly and efficiently to new and changing communications protocols. The modular design may be provided by software processes called facilities and utilities. A facility provides support for a specific link layer communications protocol, whereas a utility provides translation between higher level protocols. In a particular embodiment, utilities may be cascaded to provide layered protocol support.

Particular embodiments may include managing the communications between facilities and utilities. In one embodiment, a communications subsystem maintains a process table having an entry for each process running on the protocol converter. In this manner, functions between utilities and facilities are isolated, process interfaces are clearly defined and robust, and the hardware/software interface in the protocol converter is accurately defined and reliably maintained. Other particular embodiments may include a session manager that spawns facilities and utilities, a logon subsystem, and a translator subsystem.

FIG. 1 illustrates a communications system 10 that includes a host 12, a protocol converter 14, and a plurality of remotes 16, 18, and 20. Host 12 and remotes 16, 18, and 20 may operate using different communications protocols. A protocol is generally any format, definition, or specification for the communication of data, whether implemented in software, hardware, or both. A protocol may include, without limitation, transmission rates, frame formats, blocking formats, text formats, stop/start indicators, framing and heading indicators, field definitions, checksum values, carriage return and line feed (CR/LF) indicators, and any other suitable information that specifies the content or nature of the transmitted data. In general, protocol converter 14 establishes communications sessions that allow host 12 and remotes 16, 18, and 20 to exchange data.

Host 12 comprises a memory 22 and a processor 24 that together operate to store, process, or manipulate data. Memory 22 and processor 24 are coupled to an interface 26 using bus 28. Interface 26 of host 12 couples to interface 30 of protocol converter 14 using link 28. Generally, host 12 may be any processing device coupled to any suitable wireline or wireless link 28 to communicate data with other processing devices. In one particular embodiment, host 12 comprises a main frame computer and link 28 communicates data using the IBM 3770 communications protocol.

Remotes 16, 18, and 20 each include a memory 32 and a processor 34 that together operate to store, process, or manipulate data. Memory 32 and processor 34 of remotes 16, 18, and 20 are coupled to an interface 36 using bus 38. Interfaces 36 for remotes 16, 18, and 20 couple to interface 40 of protocol converter 14 using links 42, 44, and 46, respectively. Generally, remotes 16, 18, and 20 may be any processing device coupled to any suitable wireline or wireless link 42, 44, and 46, respectively, to communicate data with other processing devices. For example, remotes 16, 18, and 20 may be mainframes, mini-frames, or personal computers and links 42, 44, and 46, respectively, communicate data using ASYNC, BISYNC, SDLC/SNA, X.25, TCP/IP, X.400, or any suitable communications protocol. For example, the ASYNC family of protocols may include specific implementations, such as XMODEM, YMODEM, ZMODEM, KERMIT, or other standards of asynchronous data communications.

As described above, protocol converter 14 couples to host 12 using interface 30 and to remotes 16, 18, and 20 using interface 40. In a particular embodiment, interface 30 comprises IBM host LUA hardware that implements the IBM communications manager. Interface 30 may also be any other suitable hardware that supports token ring, leased line, or switched line communications between protocol converter 14 and host 12. In a particular embodiment, interface 40 comprises one or more real-time interface coprocessors (RTIC) cards that implement any suitable synchronous, asynchronous, or other communications protocol between remotes 16, 18, and 20 and protocol converter 14.

Interfaces 30 and 40 are coupled to and interact with processes 50 and subsystems 60 of protocol converter 14. Processes 50 include a session manager 52, a set of facilities 54, and a set of utilities 56. Subsystems 60 include a logon subsystem 62, a communications subsystem 64, and a translator subsystem 66. Logon subsystem 62 is coupled to a logon database 68 that stores configuration data and logon definitions for users of protocol converter 14. Communications subsystem 64 is coupled to a process table 70 that maintains a list of processes 50 running on protocol converter 14. In a particular embodiment, subsystems 60 are dynamically linked libraries (DLLs) that are accessed using an application programmer interface (API).

An important technical advantage of protocol converter 14 is the use of facilities 54 and utilities 56 running as software processes on protocol converter 14. Protocol converter 14 maintains a set of facilities 54, each designed to support a specific link layer or line layer communications protocol, such as ASYNC, BISYNC, X.25, and others. In a particular embodiment, facilities 54 support an ASYNC passthrough protocol that passes data to utilities 56 with a minimum of alteration. Utilities 56 may then provide much of the protocol conversion of the raw ASYNC passthrough data in software, which provides greater flexibility for supporting new protocols. If a link layer protocol is changed or a new link layer protocol is added, additional facilities 54 may be written or existing facilities 54 may be modified to add additional functionality to protocol converter 14.

Protocol converter 14 also maintains a set of utilities 56 that provide higher level protocols, such as TCP/IP, XMODEM, YMODEM, ZMODEM, and KERMIT, as well as conversion, translation, formatting, or other interfacing functions between two facilities 54 in a communications session. Furthermore, utilities 56 may be written to provide customized communications sessions associated with individual users, groups of users, or specific devices in communications system 10. Additional utilities 56 may be written or existing utilities 56 modified to add functionality to protocol converter 14.

Utilities 56 may also be cascaded to provide layered protocol support. For example, a typical TCP/IP communications session between remote 16 and protocol converter 14 may be supported by a single ASYNC facility and several cascaded or layered utilities. In such a session, the lowest level ASYNC facility receives data from remote 16 and communicates the data to an Internet protocol (IP) utility. The IP utility then communicates the data to a transport communication protocol (TCP) utility, which in turn communicates the data to the highest level file transfer protocol (FTP) utility. Similarly, data communicated from protocol converter 14 to remote 16 passes through FTP utility, TCP utility, IP utility, and ASYNC facility. In this manner, utilities 56 may be arranged in layers to provide a flexible and powerful protocol conversion function. It should be understood that utility 56 may refer to a single utility or a collection of cascaded or layered utilities.

Both facilities 54 and utilities 56 operate as software processes with defined functions and data interfaces that provide a modular software design that promotes debugging and modification of protocol converter 14. By spawning, linking, and layering facilities 54 and utilities 56, session manager 52 can reliably construct a variety of communications sessions in protocol converter 14.

Protocol converter 14 may operate on one or more computers, shown generally as computer 72. Computer 72 maintains and executes the instructions to implement processes 50 and subsystems 60. Computer 72 may include an input device 74, such as a keypad, touch screen, or other device that can accept information. Output device 76 conveys information associated with the operation of protocol converter 14, including digital or analog data, visual information, or audio information. Both input device 74 and output device 76 may include fixed or removable storage media, such as a magnetic computer disk, CD-ROM, or other suitable media to both receive output from and provide input to protocol converter 14. Processor 78 and its associated volatile or non-volatile memory execute instructions and manipulate information in accordance with the operation of protocol converter 14.

In operation, protocol converter 14 establishes a communications session between two or more devices using different communications protocol. In one example, remote 16 may attempt to communicate with host 12. Remote 16 communicates data at a first protocol to interface 40 of protocol converter 14 using link 42. Interface 40 then passes this data to selected facilities 54 and utilities 56 to accomplish conversion of the data to a second protocol. The data in the second protocol is then passed to interface 30, which in turn passes the data in the second protocol to host 12 using link 28.

During communications between remote 16 and host 12, session manager 52 spawns processes 50, including selected facilities 54 and utilities 56. Communications subsystem 64 maintains a list of spawned processes 50 in process table 70 to manage communications among processes 50. Logon subsystem 62 receives logon information from remote 16 and accesses configuration data and logon definitions from logon database 68. This information may be used to select and/or configure processes 50 that establish the communications session between remote 16 and host 12. The translator subsystem 66 may be utilized by processes 50 to perform data conversions.

Figure 2:
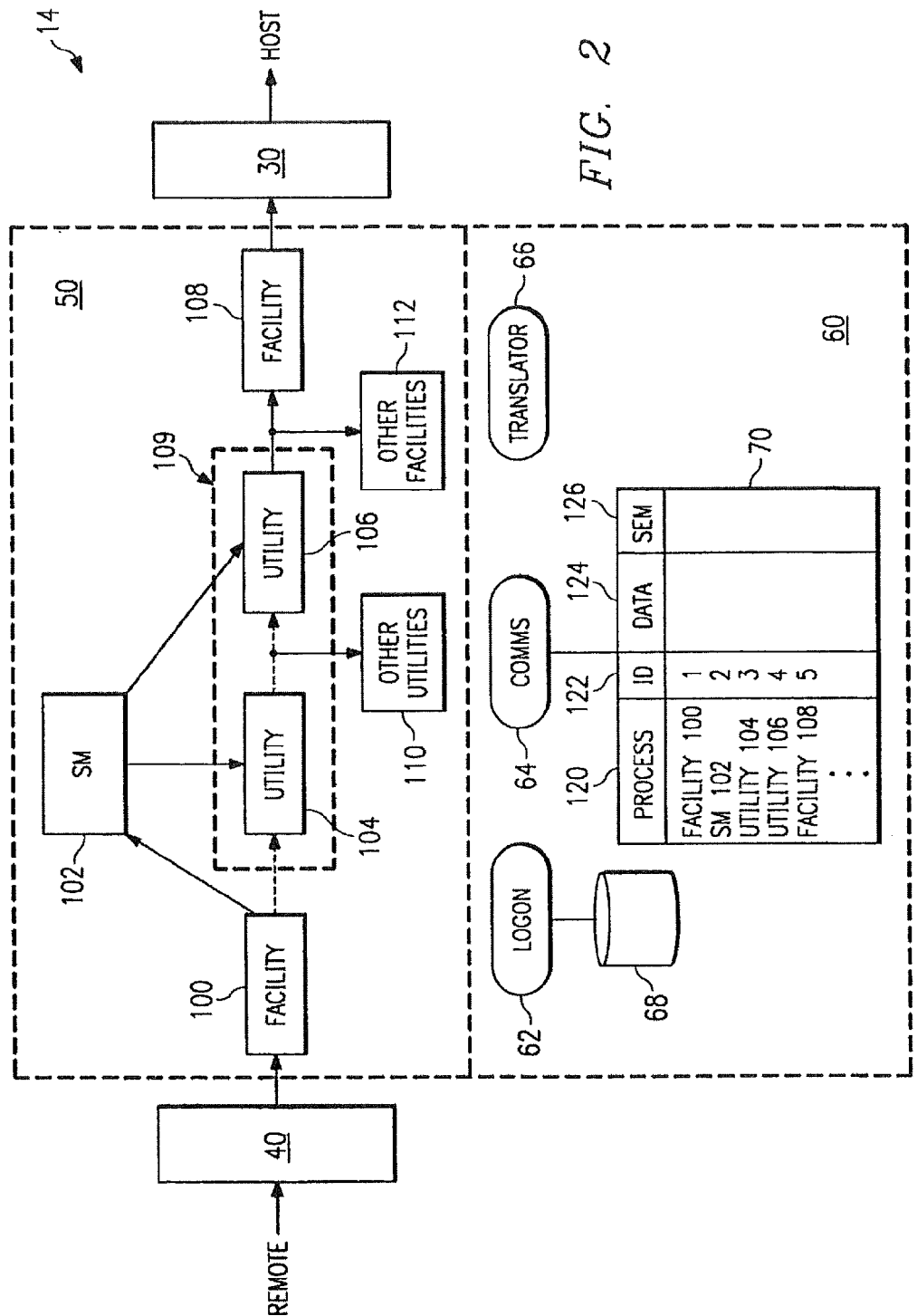
FIG. 2 illustrates a simplified block diagram of the operation of the protocol converter.

FIG. 2 illustrates a simplified block diagram of the operation of protocol converter 14 to establish a communications session between remote 16 and host 12. This communications session utilizes processes 50 and subsystems 60. Although FIG. 2 describes the communications session as originating from remote 16 and terminating at host 12, it should be understood that unidirectional or bidirectional communications originated from any processing device in communications system 10 and terminating at any other processing device may be present in other embodiments.

Data in a first protocol from remote 16 is received at interface 40 of protocol converter 14. Interface 40 passes the data to facility 100 which supports the link layer communications protocol utilized by remote 16. Facility 100 communicates the content or existence of the received data to session manager 102 which spawns utility 104. Facility 100 then communicates data to utility 104. In a particular embodiment, session manager 102 may spawn an additional utility 106 which couples to utility 104. Utility 106 communicates data to facility 108 which supports communication of data in a second link layer protocol utilized by host 12. Facility 108 then communicates data in the second protocol to interface 30 for delivery to host 12. Utility 104, utility 106, or both may be comprised of several cascaded or layered utilities.

In one embodiment, utilities 104 and 106 may be a single utility spawned by session manager 102, as indicated by dashed line 109. If utilities 104 and 106 are separate utilities spawned by session manager 102, then utility 104 may translate data received from facility 100 in a first protocol into raw data for delivery to utility 106. Raw data may be any suitable generic representation of data that is communicated between utilities. This raw data may be coupled to other utilities 110 for translation and delivery to other devices. In addition, the output of utility 106 may be coupled to other facilities 112 for delivery to interface 30, interface 40, or other interface circuitry of protocol converter 14. For example, one of the other facilities 112 may couple to a portion of interface 40 to deliver data in a first protocol from remote 16 to data in a second protocol to remote 18, remote 20, or both.

During the establishment of a communications session between remote 16 and host 12, communications subsystem 64 generates a process table 70 that includes an entry for processes 50 running on protocol converter 14. Processes 50 may be entered into process table 70 as the communications session is established or may already be entered upon power up or initialization of protocol converter 14. Each entry in process table 70 includes a process name 120, a process ID 122, data 124, and a semaphore 126.

For the particular embodiment of FIG. 2, process table 70 includes the following entries to support the communications session between remote 16 and host 12: facility 100, session manager 102, utility 104, utility 106, and facility 108. Each entry is given a separate identifier 122 that is used in messaging between processes 50. For example, a message sent from facility 100 to utility 104 may specify its source process ID 122 as "1" and its destination process ID 122 as "3". Communications subsystem 64 operates to control the messaging between processes 50, as described in more detail below with reference to FIG. 4.

Logon subsystem 62 coupled to logon database 68 is accessible by all processes 50 to retrieve configuration data and logon definitions for users of protocol converter 14. For example, logon database 68 may include a logon definition that specifies utility 104 to be spawned by session manager 102 upon reception of data from remote 16. Logon database 68 may also include a second or outgoing logon definition for remote 16 that specifies utility 106 or other utilities 110 to be spawned by session manager 102 for completing the communications session. In this manner, logon subsystem 62 can maintain separate incoming and outgoing logon definitions that are associated with a first communications link between remote 16 and protocol converter 14 and a second communications link between protocol converter 14 and host 12. These logon definitions may be combined to establish a variety of communications session between devices in communications system 10. In addition, logon subsystem 62 may retrieve information from logon database 68 to validate a user name and password provided by remote 16, or to access or process other account information of remote 16.

Translator subsystem 66 may be accessed by utilities 104, 106, and 110 to provide data translation. For example, utility 104 may translate data from ASCII format into an IBM-compatible format, such as EBCDIC. In addition, translator subsystem 66 may be utilized by utilities 104, 106, and 110 to manipulate records separation, such as carriage return and line feed information, and to provide other formatting of data. Therefore, translator subsystem 66 comprises a set of commonly accessible routines that perform a specific operation on data.

Figure 3A:
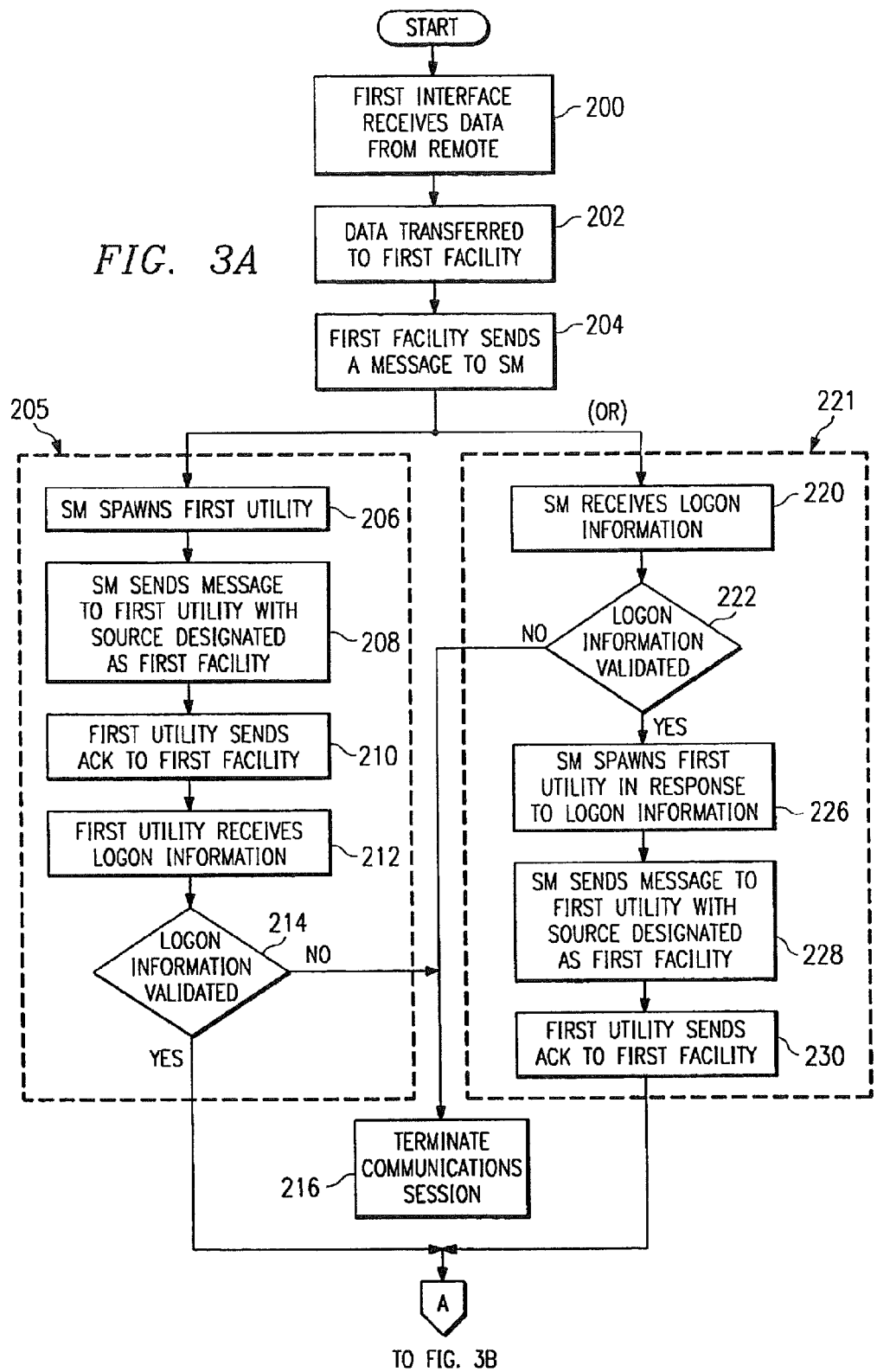

FIGS. 3A and 3B are a flow chart of a method for establishing a communications session between remote 16 and host 12. The method begins at step 200 where a first interface 40 receives data from remote 16. The data is transferred to first facility 100 at step 202. First facility 100 then sends a message to session manager 102 at step 204 indicating that first facility 100 has received data from or otherwise established communications with remote 16. At this point, session manager 102 may proceed using two different embodiments, as indicated collectively by steps 205 or 221.

In one embodiment using steps 205, session manager 102 spawns first utility 104 at step 206 in response to the message received from first facility 100. At step 208, session manager 102 sends a message to first utility 104 with the message source designated as first facility 100. In response, first utility 104 sends an acknowledgment to first facility 100 at step 210. In this manner, session manager 102 utilizes the source address of the message sent to first utility 104 to establish communications between first facility 100 and first utility 104. First utility 104, now coupled with first facility 100, receives logon information from remote 16 at step 212. At step 214, first utility 104 accesses logon subsystem 62 to validate logon information received from remote 16. If the logon information is not validated at step 214, then the communications session is terminated at step 216.

In another embodiment using steps 221, session manager 102 receives logon information from first facility 100 at step 220. At step 222, session manager 102 accesses logon subsystem 62 and logon database 68 to validate logon information received from remote 16. If the logon information is not validated at step 222, then the communications session is terminated at step 224. If the logon information is validated at step 222, then session manager 102 spawns first utility 104 at step 226 in response to the logon information. For example, the logon information received by session manager 102 from remote 16 or logon database 68 may specify a particular utility 104 to be utilized in the communications session between remote 16 and host 12. At step 228, session manager 102 sends a message to first utility 104 with the message source designated as first facility 100. First utility 104 sends an acknowledgment to first facility 100 at step 230. This acknowledgment of the message received from session manager 102 establishes communications between first facility 100 and first utility 104.

After spawning first utility 104 using steps 205 or steps 221, session manager 102 may spawn second utility 106. These steps designated collectively as steps 240 are optional if the communications session between remote 16 and host 12 does not utilize second utility 106. If second utility 106 is utilized in the communications session, then session manager 102 spawns second utility in response to logon information at step 242. For example, logon information received from remote 16 or retrieved using logon subsystem 62 and logon database 68 may specify second utility 106 to be utilized in the communications session. At step 244, session manager 102 sends a message to second utility 106 with the message source designated as first utility 104. Second utility 106 sends an acknowledgment to first utility 104 at step 246. This acknowledgment of the message received from session manager 102 establishes communications between first utility 104 and second utility 106.

Second facility 108 receives data from first utility 104 or second utility 106 at step 248, depending on whether the communications session between remote 16 and host 12 utilizes second utility 106. Second facility 108 transfers this data to second interface 30 at step 250. Second interface 30 establishes communications with host 12 at step 252, and the establishment of the communications session between remote 16 and host 12 is complete.

FIG. 4 is a flow chart of a method to manage communications of messages among processes 50 running on protocol converter 14. In the embodiment of FIG. 2, this method manages communications among the following process 50: facility 100, session manager 102, utility 104, utility 106, and facility 108. The method begins at step 300 where a first process informs communications subsystem 64 that it has data for a second process. This data may be a message, instruction, response, acknowledgment, or any other information to be communicated from the first process to the second process.

Communications subsystem 64 posts data in data field 124 of process table 70 associated with the second process at step 302. Communications subsystem 64 sets semaphore 126 of process table 70 associated with the second process at step 304. The second process then detects the setting of its associated semaphore 126 and receives data stored in its associated data field 124 at step 306.

In one embodiment, the second process may process the data and generate other data for a third process at step 308. The second process informs communications subsystem 64 that it has data for the third process at step 310. Communications subsystem 64 posts data in the data field 124 of process table 70 associated with the third process at step 312. Communications subsystem 64 sets semaphore 126 of process table 70 associated with the third process at step 314. The third process then detects its associated semaphore 126 and receives data from its associated data field 124 at step 316. In this manner, communications subsystem 64 utilizing process table 70 is able to strictly and consistently manage communications between separate processes 50 running on protocol converter 14.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-readable storage device comprising instructions that, when executed by a processor, cause the processor to:
    receive first data in accordance with a first protocol from a first node using a first facility;
    store data in a data field of a first entry in a process table;
    set a first semaphore in a first semaphore field of the first entry indicating that the first data has been stored in the first entry;
    translate the first data into second data using a first utility;
    store data in a data field of a second entry in the process table;
    set a second semaphore in a second semaphore field of the second entry indicating that data has been stored in the second entry; and send the second data from a second facility to a second node in accordance with a second protocol.

2. The computer-readable storage device of claim 1, further comprising operational instructions that, when executed by the processor, cause the processor to use a logon subsystem to retrieve configuration data and logon definitions usable by at least one of the first facility and the second facility.

3. The computer-readable storage device of claim 2, wherein the logon subsystem retrieves the configuration data and the logon definitions from a logon database.

4. The computer-readable storage device of claim 1, further comprising operational instructions that, when executed by the processor, cause the processor to update the process table using a communication subsystem.

5. The computer-readable storage device of claim 1, wherein each entry in the process table includes a process identification field.

6. The computer-readable storage device of claim 1, wherein the first facility, the first utility, and the second facility operate as software processes with defined functions and data interfaces.

7. The computer-readable storage device of claim 1, wherein the first data is received from the first node at a first interface and wherein the second data is sent to the second node via a second interface.

8. The computer-readable storage device of claim 7, wherein the first interface is associated with the first protocol and wherein the second interface is associated with the second protocol.

9. A apparatus comprising:
a protocol converter comprising:
a first facility configured to receive first data in accordance with a first protocol from a first node via a first interface;
a first utility configured to translate the first data into second data;
a second facility configured to send the second data to a second node via a second interface and in accordance with a second protocol; and
a communication subsystem configured to:
set a first semaphore in a first semaphore field of a first entry in a process table, wherein the first entry is associated with the first utility, and wherein the first utility translates the first data into the second data in response to detecting the setting of the first semaphore; and
set a second semaphore in a second semaphore field of a second entry in the process table, wherein the second facility sends the second data to the second node via the second interface in response to detecting the setting of the second semaphore.

10. The apparatus of claim 9, further comprising a session manager configured to:
receive a first message indicating receipt of the first data from the first facility; and
spawn the first utility in response to receipt of the first message.

11. The apparatus of claim 9, further comprising:
a logon subsystem configured to store configuration data and logon definitions; and
a session manager configured to:
receive logon information from the first facility;
validate the logon information based on the configuration data and the logon definitions stored at the logon subsystem; and
spawn the first utility in response to validating the logon information, wherein the logon information identifies the first utility.

12. The apparatus of claim 9, wherein the communication subsystem is further configured to manage communications between the first facility, the first utility, the second facility, or any combination thereof.

13. The apparatus of claim 9, wherein the communication subsystem is further configured to receive a first message indicating receipt of the first data from the first facility at the communications subsystem.

14. The apparatus of claim 13, wherein the first message includes a source identifier and a destination identifier, wherein the source identifier is associated with the first facility and the destination identifier is associated with the first utility, wherein the first data is stored in a first data field of the first entry based on the destination identifier received in the first message, and wherein the first semaphore is set in the first semaphore field of the first entry based on the destination identifier.

15. A method comprising:
receiving first data in accordance with a first protocol from a first node using a first facility;
storing data in a data field of a first entry in a process table in a memory device;
setting a first semaphore in a first semaphore field of the first entry indicating that the data has been stored in the first entry;
translating the first data into second data using a first utility;
storing data in a data field of a second entry in the process table;
setting a second semaphore in a second semaphore field of the second entry indicating that the data has been stored in the second entry; and
sending the second data from a second facility to a second node in accordance with a second protocol.

16. The method of claim 15, using a logon subsystem to retrieve configuration data and logon definitions usable by at least one of the first facility and the second facility.

17. The method of claim 16, wherein the logon subsystem retrieves the configuration data and the logon definitions from a logon database.

18. The method of claim 15, further comprising updating the process table using a communication subsystem.

19. The method of claim 15, wherein each entry in the process table includes a process identification field.

20. The method of claim 15, wherein the first facility, the first utility, and the second facility operate as software processes with defined functions and data interfaces.

* * * * *